United States Patent [19]

Muldoon

[11] Patent Number: 5,409,363
[45] Date of Patent: Apr. 25, 1995

[54] APPARATUS FOR PROCESSING OF FOODSTUFFS

[75] Inventor: Robert J. Muldoon, Norwalk, Conn.

[73] Assignee: Steinmetz Machine Works, Inc., Stamford, Conn.

[21] Appl. No.: 119,284

[22] Filed: Sep. 9, 1993

[51] Int. Cl.[6] ............................................. A21C 11/02
[52] U.S. Cl. ................... 425/167; 425/348 R; 425/385; 425/512
[58] Field of Search ............... 425/168, 345, 360, 385, 425/348 R, 375, 453; 426/512; 264/284

[56] References Cited

U.S. PATENT DOCUMENTS

| | | | |
|---|---|---|---|
| 4,012,185 | 3/1977 | Poore et al. | 425/360 |
| 4,246,838 | 1/1981 | Pulver et al. | 425/385 |
| 4,696,823 | 9/1987 | De Christopher | 426/512 |
| 4,826,697 | 5/1989 | Ferrero | 426/512 |

FOREIGN PATENT DOCUMENTS

| | | | |
|---|---|---|---|
| 95245 | 1/1963 | Denmark | 425/348 R |
| 225901 | 8/1985 | Germany | 425/385 |
| 237555 | 5/1964 | Netherlands | 425/348 R |

*Primary Examiner*—Khanh Nguyen
*Attorney, Agent, or Firm*—St. Onge Steward Johnston & Reens

[57] ABSTRACT

Apparatus for stamping a pattern into bread doughs in which the dough is continuously conveyed in cups and is stamped by star shaped tips of pattern forming tools mounted to a stamping head. The stamping head travels in an elliptical path by virtue of a pinion ring assembly with supports for the stamping head mounted in positions offset from the center of a turret pinion that rotates as it orbits a turret ring. An eccentric pinion assembly controls the speed of the stamping head by controlling the speed of the turret pinion's orbit around the turret rings, so that the stamping head's speed is decreased to match the speed of the cups while dough stamping occurs, and its speed is increased during repositioning of the stamping head for the next set of dough-filled cups.

24 Claims, 9 Drawing Sheets

APPARATUS FOR PROCESSING OF FOODSTUFFS

BACKGROUND OF THE INVENTION

1. Field of the Invention

This invention relates to an apparatus and method to stamp, form, or otherwise process a portion of a foodstuff located on a moving conveyor. The invention has particular application to the processing of bread dough, such as dough to be baked in the form of rolls, which is to be imprinted with a pattern.

2. Background of the Invention

Kaiser rolls (and also hard rolls and water rolls) are baked dough products that are traditionally made with five curved lines formed in the upper surface of the roll. The curved lines radiate from a central point on the upper surface of the roll.

Commercial bakeries use a roll stamping machine to create the lines on the roll. Dough blanks are loaded into rows of cups in a roll stamping machine, which cups are then advanced to a position below a stamping head. The movement of the row of cups containing dough blanks is then stopped. The stamping head, and associated stamping dies, which are held in a lifted position by a pneumatic cylinder, descend upon a row of the stopped cups by release of air from the cylinder, and a pattern is stamped by the dies in the top of each dough blank. In these known roll stamping machines, the movement of the row of cups is intermittent, in that the forward motion of the conveyor that supports the row of cups is halted when the stamping head is stamping a row of dough blanks. The interrupted motion of the conveyor is necessary to prevent the mutilation of the dough that would occur during stamping if the dough continued to advance while the dies were engaged in stamping the dough.

These prior art roll stamping machines are limited in their production capability to a maximum rate of 35 strokes of the stamping head per minute.

OBJECTS OF THE INVENTION

It is an object of the present invention to provide an apparatus and method for the processing of foodstuffs such as doughs that require die cutting or imprinting, and particularly for doughs to be stamped to form kaiser rolls, in which the rate of production of processed doughs can be substantially increased over rates possible in known machinery and methods.

It is an object of the invention to provide an apparatus and method permitting continuous movement of a conveyor carrying rows of dough blanks, and to process the dough blanks while in movement, without creating any greater risk of damage to the dough blank than would arise in conventional roll stamping machines.

Other objects, aspects and features of the present invention in addition to those mentioned above will be pointed out in or will be understood from the following detailed description provided in conjunction with the accompanying drawings.

SUMMARY OF THE INVENTION

An apparatus for processing of a foodstuff, with particular application to stamping a pattern in bread dough, comprises a conveyor, a stamping head, and a gearing assembly. The conveyor supports the foodstuff or a container for the foodstuff, and continuously advances the foodstuff through a stamping zone. The stamping head has one or more pattern stamping tools for stamping the foodstuff when said foodstuff is conveyed through the stamping zone. The stamping head is driven in an elliptical path, and its speed varies during the course of its elliptical path. The stamping head elliptical path is obtained by a pinion ring assembly. The variable speeds are achieved preferably by an eccentric pinion assembly.

The pinion ring assembly includes a plurality of turret rings; a rotatable turret pinion travels around the inner perimeter of each turret ring. The stamping head is mounted to supports which extend from the turret pinions from a position offset from the center of the turret pinions. Preferably there are four such turret rings and four such turret pinions, all identically positioned and moving synchronously.

Accordingly, when the turret pinions are driven around the turret rings, the supports and the stamping head travel in an elliptical path, such that the pattern stamping tools are lowered to stamp the foodstuff and travel with the container and foodstuff for a brief period, and then are raised and returned to their starting position to stamp a subsequent container of the foodstuff.

The stamping head's elliptical path is oriented such that the major axis of the stamping head's path is the vertical axis and the minor axis is the horizontal axis (i.e. the distance of the stamping head's vertical movement is greater than its horizontal movement).

The eccentric pinion assembly decreases the speed of the stamping head during its downward stroke as it is lowered downwardly from a lifted position, to ultimately synchronize the lateral speed of the stamping head to the speed of the foodstuff in the conveyor, whereupon the pattern stamping tool stamps a foodstuff while the foodstuff is located in the stamping zone. The eccentric pinion assembly thereafter increases the speed of the stamping head during its upward stroke as it is lifted up from the foodstuff, in order that the stamping head can be quickly repositioned for the next foodstuff to be stamped.

The eccentric pinion assembly has a first eccentric pinion mounted to a drive shaft, and a mating eccentric pinion mounted to a driven shaft. The driven shaft has offset shaft ends and the above-mentioned turret pinions of the pinion ring assembly are rotably mounted to the offset shaft ends. In the preferred embodiment, a second driven shaft is mechanically coupled to the first driven shaft by gearing or the like, and offset mounted turret pinions of the second driven shaft operate identically with the pinions of the first driven shaft.

The turret pinions are consequently driven around the turret rings at varying speeds as determined by the eccentric pinions, and in particular, by eccentric pinions selected for the variable speed pattern described above. In the preferred embodiment, this is achieved by orienting the first eccentric pinion with its smaller lobe adjacent the larger lobe of the second eccentric pinion when said turret pinions are located in the lower portion of their orbit, and thereafter the first eccentric pinion is oriented with its larger lobe adjacent the smaller lobe of the second eccentric pinion when said turret pinions are located in the upper portion of their orbit.

Preferably, the turret pinion makes one full 360 degree revolution during each of its orbits around the turret ring, and has an external diameter which is one-half an inner diameter of the turret ring.

Preferably, the stamping head is provided with a means for translating vertical motion of the stamping head to rotational motion of the pattern stamping tools, such that the pattern stamping tools are rotated to form a pattern in the foodstuff when the stamping head is lowered to the container. The die of the pattern stamping tool preferably has a generally spiral star shaped tip portion for forming a pattern in the dough. A plurality of pre-flatteners may be affixed to the stamping head and located in front of the pattern forming tools to pat the foodstuff and/or flatten its upper surface before a pattern is imprinted by the pattern stamping tools.

A method of stamping a foodstuff in accordance with the invention generally comprises loading a plurality of foodstuffs into containers; continuously conveying the containers through a stamping zone at a fixed speed; lifting and lowering a stamping head in an elliptical path; reducing the orbital speed of the stamping head to synchronize a lateral speed of the stamping head to the speed of the container when a stamping head is stamping the foodstuff; stamping the foodstuff with pattern stamping tools affixed to the stamping head during a latter portion of the lowering step and in an initial portion of the lifting step; lifting the stamping head upwardly to disengage the pattern stamping tools from the foodstuff; and increasing the orbital speed of the stamping head to cause the stamping head to be quickly repositioned to stamp a pattern in a subsequent foodstuff.

BRIEF DESCRIPTION OF THE DRAWINGS

The present invention may be more clearly understood from the following description of a specific and preferred embodiment read in conjunction with the accompanying schematic and detailed drawings; wherein:

FIGS. 6–11 are a series of partial side cross-sectional views of the apparatus of FIG. 5, showing a series of steps in a complete stamping cycle.

It should be understood that the drawings are not necessarily to exact scale and that certain aspects of the embodiments, may be emphasized for clarity of the invention. Actual embodiments, or installations thereof may differ, depending upon the particular location or application for which the dough processing apparatus is designed.

DETAILED DESCRIPTION OF DRAWINGS

Referring to FIGS. 1–13, an apparatus 10 for processing of a foodstuff comprises a conveyor 20, a stamping head 40, and a gearing assembly 60.

In the preferred embodiment, the apparatus 10 is especially adapted for continuously stamping or imprinting a pattern, preferably with a rotational motion, into a plurality of bread dough blanks 39 conveyed in the apparatus.

Conveyor 20 supports a plurality of cups 22, which are preferably arranged in rows. Conveyor 20 continuously advances the rows of cups 22 without interruption. Conveyor 20 preferably comprises a conveyor pinion 23 mounted to a main drive shaft 24. Conveyor pinion 23 drives one gear 26 of a dual idler gear 28. Dual idler gear 28 is rotably mounted on a driven shaft 94 so that it can free wheel without being influenced by the rotation of the driven shaft 94. A second gear 30 of the dual idler gear 28 in turn drives a conveyor driven gear 32 which is mounted to a conveyor driven shaft 34. Conveyor driven shaft 34 has a conveyor drive sprocket 36 for driving a chain loop 38. Idler sprockets 37 are provided at each end of chain loop 38. Preferably there are two such drive sprockets 36 and two such chain loops 38 on lateral sides of the conveyor 20. Cups 22 are secured to the chain loops 38. When main drive shaft 24 is rotated by an electric motor or other rotating machinery, it causes the conveyor 20 to continuously advance the cups 22 at a speed fixed by such motor or machinery.

Cups 22 may be separate units secured together or may be integral pieces, for example an integral casting containing a row of eight cups. Cups 22 are preferably coated with a material, such as PTFE, to improve the release of the foodstuffs, such as bread dough 39, to be contained therein.

Conveyor 20 transports the cups 22 through a stamping zone 42, where stamping head 40, which has a plurality of pattern stamping tools 44, stamps or imprints a pattern into the dough 39.

The stamping head 40 travels in an elliptical path 46; the speed of stamping head 40 varies during the course of its elliptical path. In particular, the speed of the stamping head 40 is reduced as it is lowered to the cups 22 to match the horizontal velocity of the stamping head 40 to the horizontal velocity of the conveyor 20, cups 22 and the dough 39 contained therein during the stamping of a pattern into the bread dough 39. This minimizes the possibility of the pattern stamping tools 44 mutilating the dough 39 to create an unsalable product. Thereafter, the speed of the stamping head 40 is increased as it is lifted from cups 22 to permit the stamping head 40 to be quickly repositioned in order that pattern stamping tools 44 can stamp a subsequent row of cups 22 containing dough 39.

Figure 12:
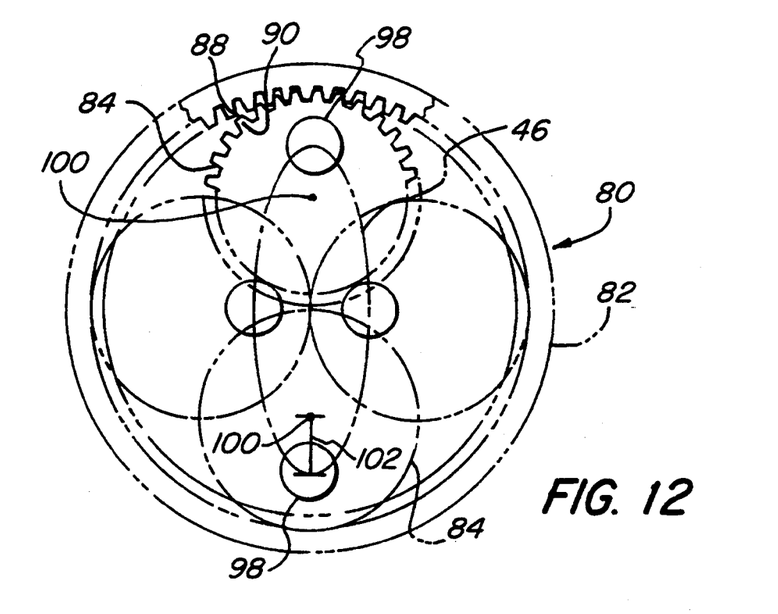
FIG. 12 is a schematic showing the elliptical motion of the pinion ring assembly for lifting the stamping head.
Figure 13:
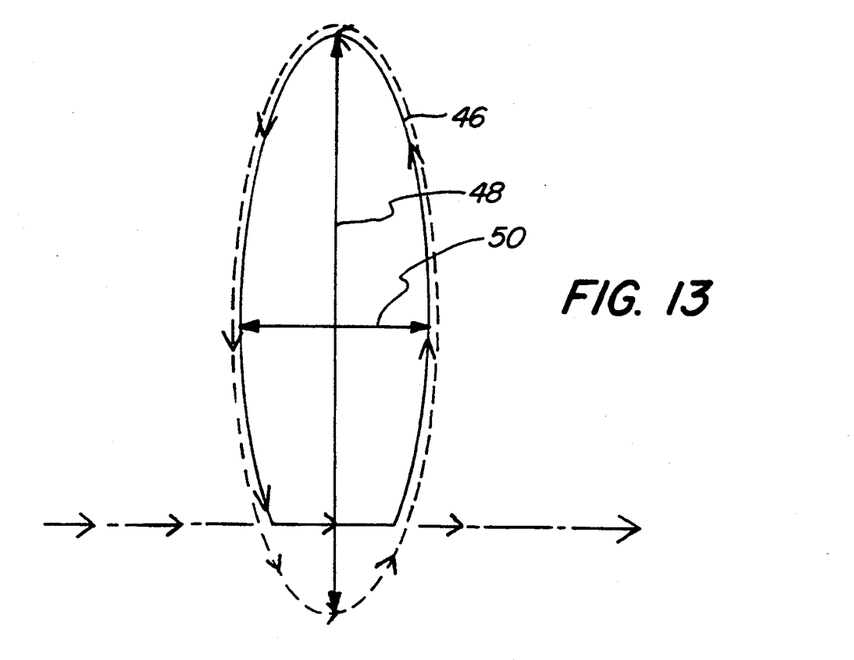
FIG. 13 is an illustration of the relative motions of the stamping head and the conveyor.

As shown in FIGS. 12 and 13, the stamping head's elliptical path is oriented such that the major axis 48 of the stamping head's path is the vertical axis and the minor axis 50 is the horizontal axis. Consequently, the distance of the stamping head's vertical movement is greater than its horizontal movement.

Referring again to FIGS. 1-13, the elliptical path 46 of stamping head 40 is achieved by a pinion ring assembly 80. The variable speeds are achieved preferably by an eccentric pinion assembly 120.

The pinion ring assembly 80 comprises a plurality of circular turret rings 82; and a plurality of mating circular turret pinions 84 traveling around the inner perimeter 86 of each turret ring 82. Preferably there are four such turret rings 82, two of each being located on lateral sides of the conveyor 20. Preferably there are four corresponding turret pinions 84. The four turret rings 82 and corresponding turret pinions 84 are all coupled together such that turret pinions 84 all move synchronously and identically through in their orbits around the inner perimeter 86 of turret rings 82.

Each turret ring 82 has a plurality of radially inwardly extending teeth 88 around its inner perimeter 86. Each circular turret pinion has a plurality of radially outwardly extending teeth 90 for meshing with turret ring teeth 88.

Turret pinions 84 are rotably mounted, by ball bearings 91 or the like, on offset segments 92 at the ends of first driven shaft 94 and second driven shaft 96. Offset segments may consist of any type of physical structure, and for example may be a rod, arm or disc. Driven shafts 94 and 96 are located along an axis extending through the center of opposed pairs of turret rings 82. The offset segments 92, and the location of the turret pinions 84 on offset segments 92, is selected such that the rotation of the driven shafts 94 and 96 causes the turret pinions 84 to be driven thereby around the inner perimeter 86 of turret rings 82 with turret pinion teeth 90 engaged with turret ring teeth 88. Turret pinions 84 consequently rotate on their bearings 91 as they orbit around the inner perimeter 86 of turret rings 82.

Turret pinions 84 each have an extending support 98 to which the stamping head 40 is rotably coupled. The stamping head 40 may be rotably mounted on the extending supports 98 by bearings located between the extending supports 98 and either or both of the turret pinions 84 and the stamping head 40 (i.e. in any columns or other supporting structures, such as end plates 47, for the stamping head 40).

Extending supports 98 are located in a position offset from the center 100 of the turret pinions 84 in order to provide the desired elliptical path 46. In particular, as can be seen in FIG. 12, the offset position of the supports 98 is a selected uniform distance X below the centers 100 of turret pinions 84 along a vertical line, illustrated at 102, extending through the centers 100 of the turret pinions, as determined when the turret pinions 84 are at a lowest point in their orbits around the turret rings 82. It is to be appreciated that when distance X from the center 100 is larger, the elliptical path 46 will have a long vertical axis 48 and a short horizontal axis 50; and that if the distance X from the center is less, that the elliptical path 46 will have a more nearly circular path, as the vertical axis 48 and a horizontal axis 50 will become equal. In the preferred embodiment, the ratio of the distance X to the pitch diameter of the turret pinion is about 0.175 to about 0.225, and most preferably is about 0.207.

Figure 2:
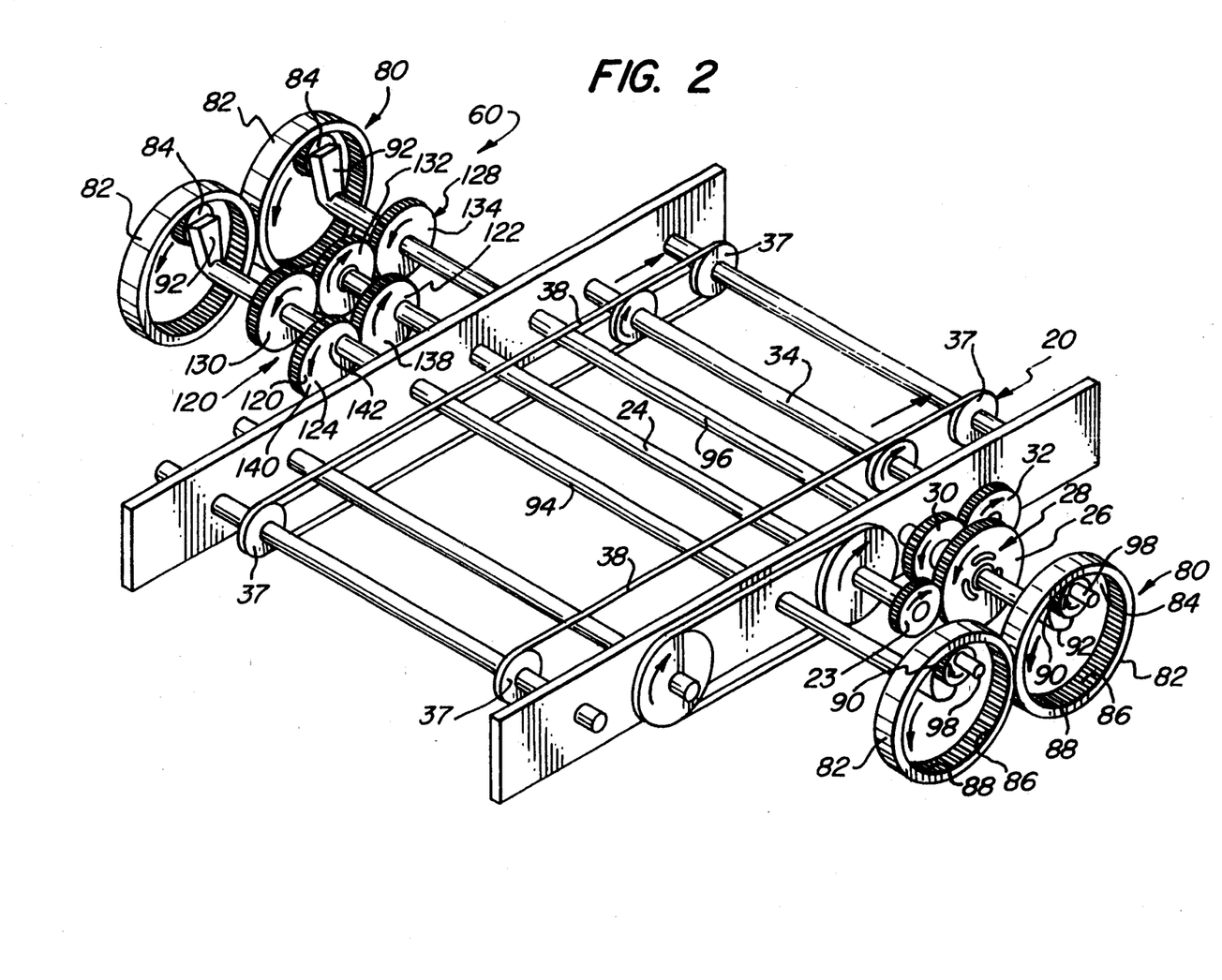
FIG. 2 is a perspective view of the gearing mechanism within the apparatus of FIG. 1, showing the operation of the gearing assembly with the stamping head of the apparatus in a lifted position.
Figure 3:
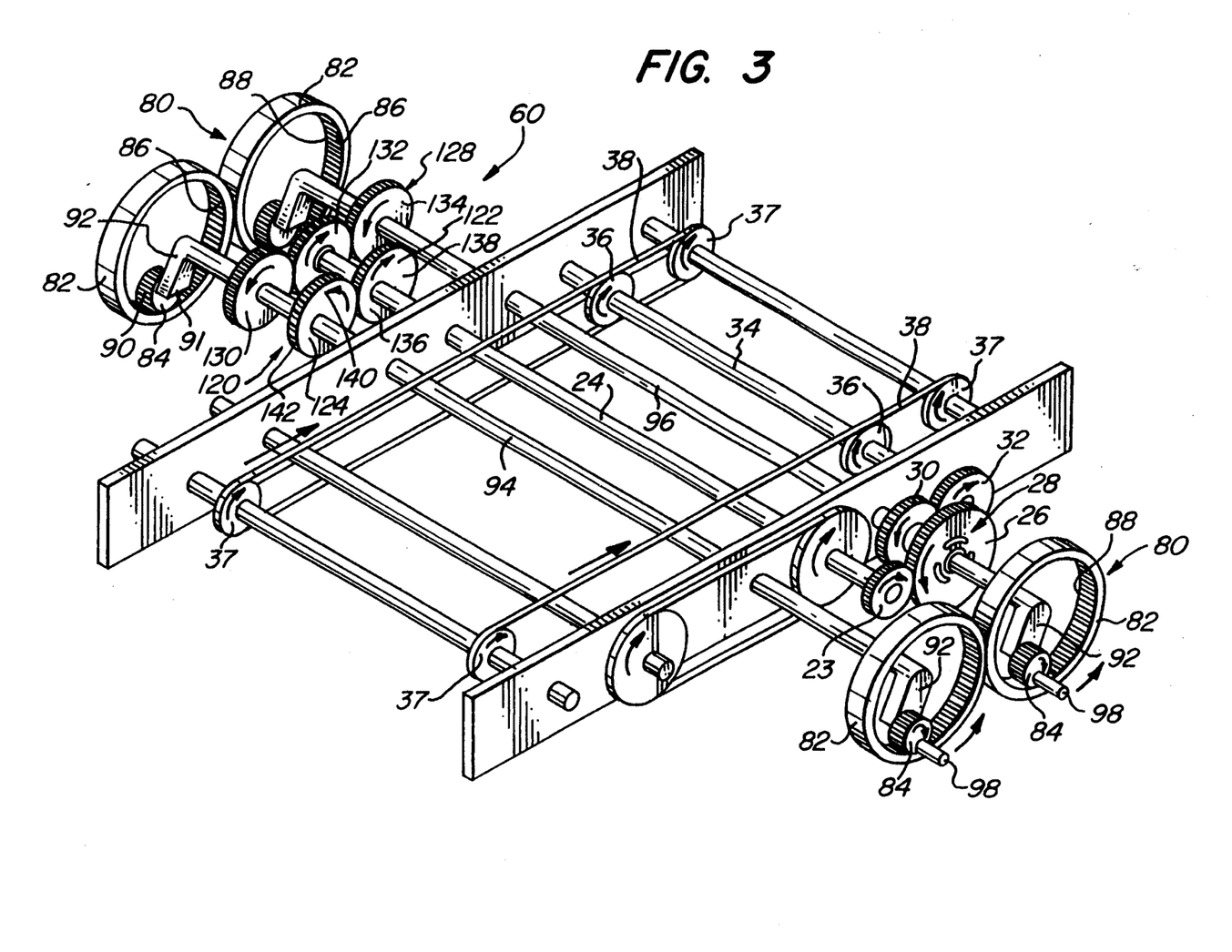
FIG. 3 is a perspective view of the gearing assembly of FIG. 2, showing the operation of the gearing assembly with the stamping head of the apparatus in a lowered position.

Each turret pinion 84 makes one full 360 degree revolution for each orbit it makes around its corresponding turret ring 82. Each turret pinion 84 thus preferably has an external diameter which is one-half an inner diameter of the turret ring. In this respect, for purposes of showing the total structure, FIGS. 2 and 3 show turret pinions 84 to be relatively smaller than preferred.

As can be seen schematically in FIG. 12, and illustratively in FIGS. 6-11, the rotation of the driven shafts 94 and 96 causes the turret pinions 84 to be driven around the inner perimeter 86 of the turret rings 82, and to rotate by the engagement of the turret pinion teeth 90 with the turret ring teeth 88. This causes the supports 98 and the stamping head 40 to travel in an elliptical path 46, such that the pattern stamping tools 44 are lowered to stamp the dough 39. The tools 44 have a horizontal vector to their elliptical path which approximately matches and is approximately synchronized with the horizontal vector (direction and speed) of the cups 22 and the dough 39 for a brief period. The stamping head 40 and tools 44 are then raised and returned to their starting position to be available to stamp dough 39 contained in a subsequent row of cups 22.

Figure 6:
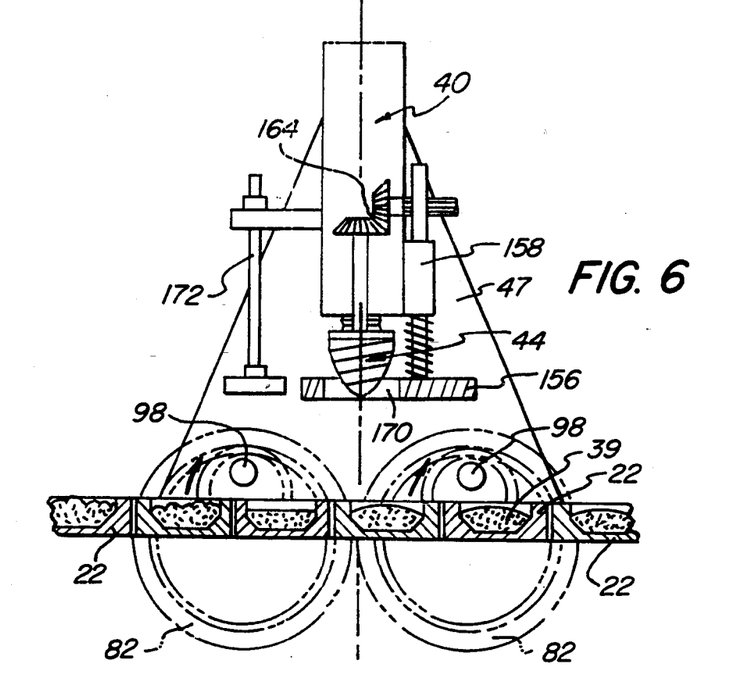
FIG. 6 shows the pinion ring assembly with the stamping head lifted to a maximum height.
Figure 7:
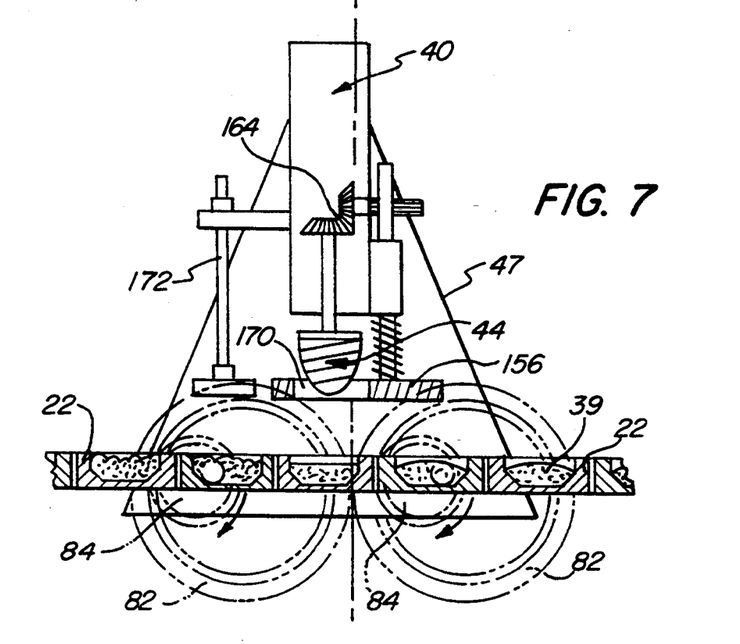
FIG. 7 shows the pinion ring assembly lowering the stamping head towards the conveyor while moving the stamping head in a direction opposite from the direction of movement of the conveyor.
Figure 8:
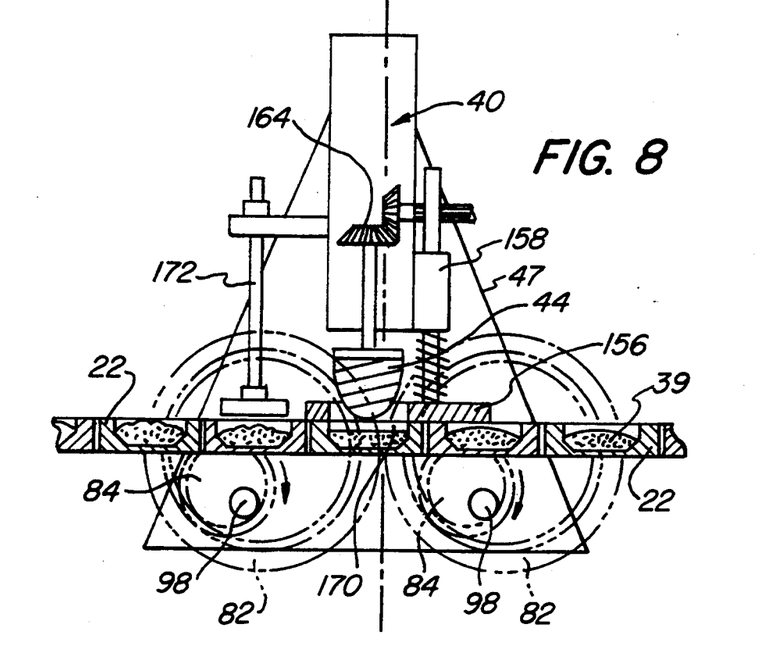
FIG. 8 shows the pinion ring assembly changing the direction of movement of the stamping head to synchronize the motion of the stamping head to the motion of the conveyor.

Eccentric pinion assembly 120 decreases the speed of the stamping head 40 during its downward stroke as it is lowered downwardly from a lifted position (as shown in FIG. 6), to synchronize the lateral speed (the horizontal vector) of the stamping head 40 to the speed (the horizontal vector) of the dough 39 in cups 22. Thereafter, the eccentric pinion assembly 120 increases the speed of the stamping head 40 during its upward stroke as it is lifted up from the dough 39 in cups 22, in order that the stamping head 40 can be repositioned for the next row of cups 22 within a minimum time period.

Figure 9:
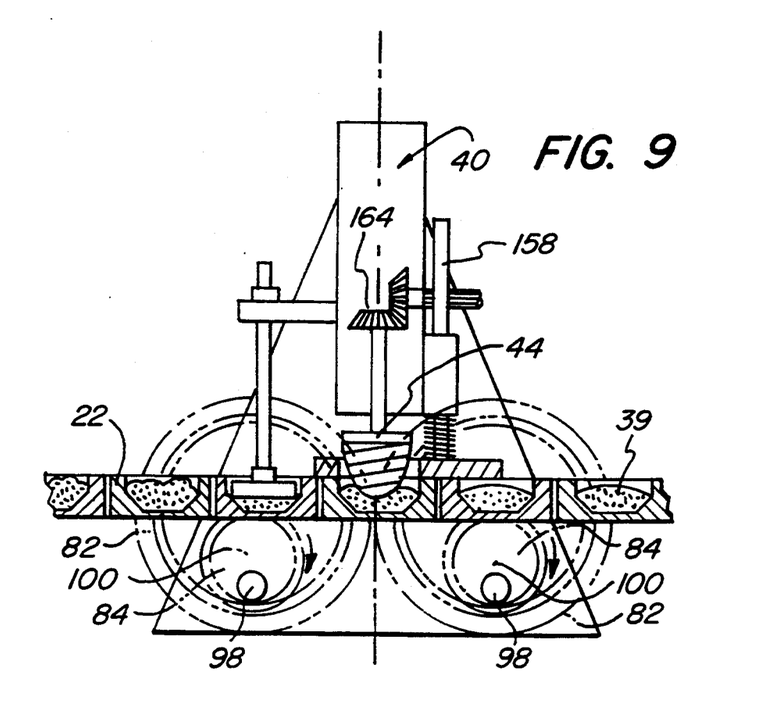
FIG. 9 shows the synchronous movement of the stamping head with the conveyor, during which dies provided on the stamping head engage and stamp the desired pattern into the dough blanks contained in cups carried by the conveyor.
Figure 10:
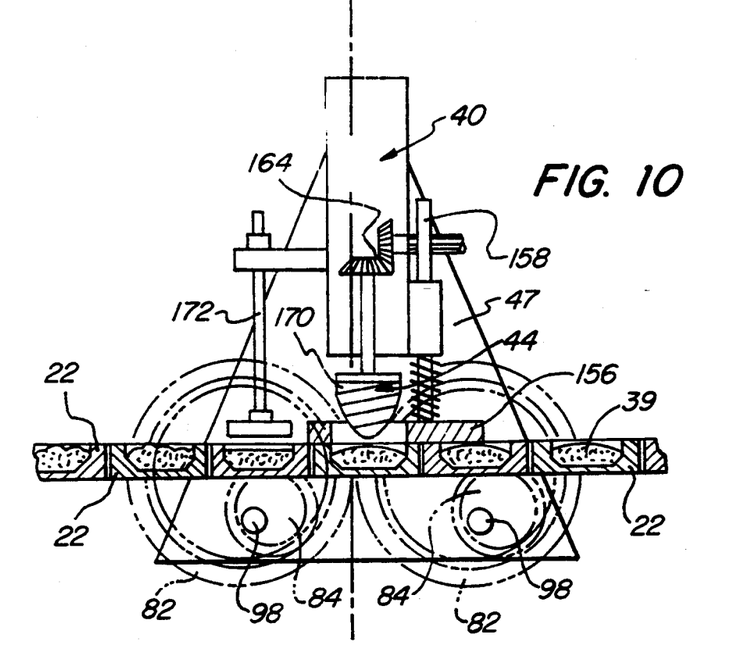
FIG. 10 shows the pinion ring assembly lifting the stamping head from the conveyor.
Figure 11:
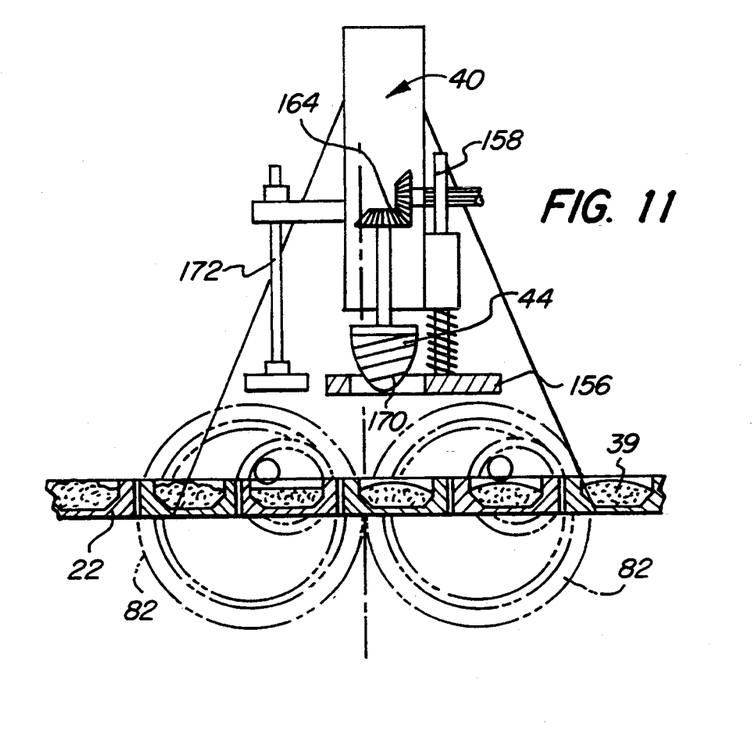
FIG. 11 shows the pinion ring assembly lifting and moving the stamping head in a direction opposite to the direction of movement of the conveyor.

"Synchronize" as used herein in the discussion of the matching of the lateral speed of the stamping head to the speed of the conveyor 20 does not mean a continuous identity of speed or velocity. It is to be appreciated that the lateral speed of the stamping head 40 may be identical to the speed of the conveyor for only a quite brief period, for example, at the perigee of its elliptical path (as shown in FIG. 9), or at two points just before and just after the perigee of its elliptical path. As used herein, to "synchronize" the lateral speed of the stamping head 40 to the conveyor 20, or containers such as cups 22, or a foodstuff such as dough 39 contained therein, means to adjust the lateral speed of the stamping head 40 sufficiently such that the foodstuff such as dough 39 is not mutilated or damaged by the stamping or other processing operation.

In the preferred embodiment, the lateral speed of the stamping head 40 and tools 44 is selected to be identical to the speed of conveyor 20 when they are at the perigee of their elliptical path 46.

Eccentric pinion assembly 120 has a first eccentric pinion 122 mounted to main drive shaft 24, and a mating eccentric pinion 124 mounted to the first driven shaft 94. Driven shaft 94 has the aforementioned offset shaft ends 92 with the turret pinions 84 of the pinion ring assembly 80 rotably mounted thereto. In the preferred embodiment, second driven shaft 96 is mechanically coupled to the first driven shaft 94 by gearing 128. Gearing 128 includes drive pinion 130 mounted on first driven shaft 94, an idler pinion 132 rotably mounted to free wheel on the main drive shaft 24, and a second driven pinion 134 mounted on second driven shaft 96. Gearing 128 thus couples the second driven shaft 96 to first driven shaft 94 so that second driven shaft 96 always rotates at the same speed as first driven shaft 94.

Turret pinions 84 are driven around the turret rings 82 at varying speeds as determined by the eccentric pinions 122 and 124. In the preferred embodiment, the described variable speed pattern is achieved by orienting the first eccentric pinion 122 with its smaller lobe 136 adjacent the larger lobe 140 of the second eccentric pinion 124 when said turret pinions 84 are located in the lower portion of their orbit (as seen in FIG. 3), and thereafter the first eccentric pinion 122 is oriented with its larger lobe 138 adjacent the smaller lobe 142 of the second eccentric pinion 124 when said turret pinions are located in the upper portion of their orbit (as seen in FIG. 2).

In order to adjust the phasing of the elliptical path 46 of stamping head 40 so that pattern forming tools 44 will be precisely centered in cups 22, the idler gear 26 is provided with slots therein so that screws holding gear 26 to gear 30 can be loosened to adjust the relative phasing of the conveyor 20 and the pinion ring assembly 80.

Figure 4:
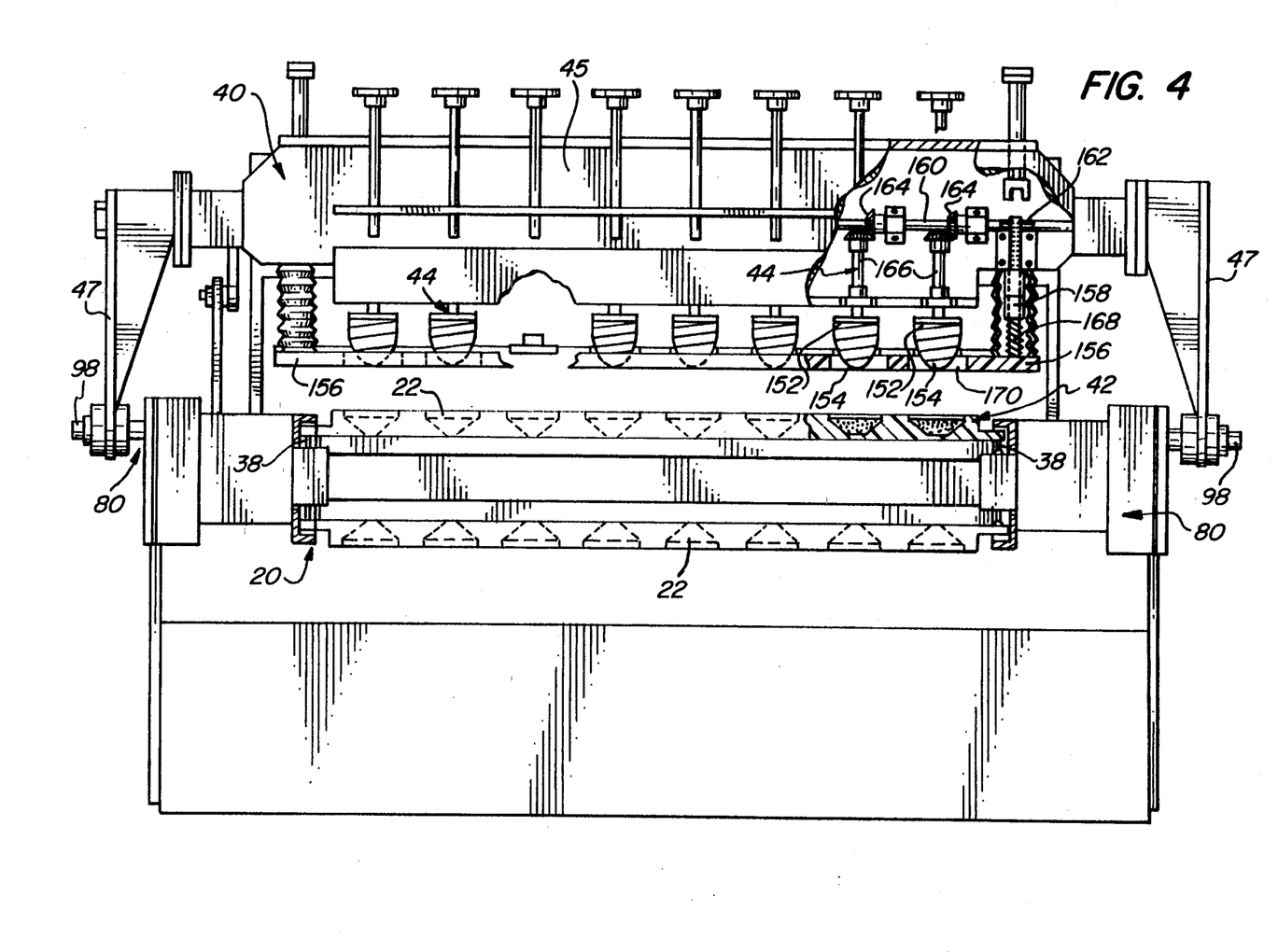
FIG. 4 is an end cross-sectional view of the apparatus of FIG. 1, showing the stamping head and conveyor.
Figure 5:
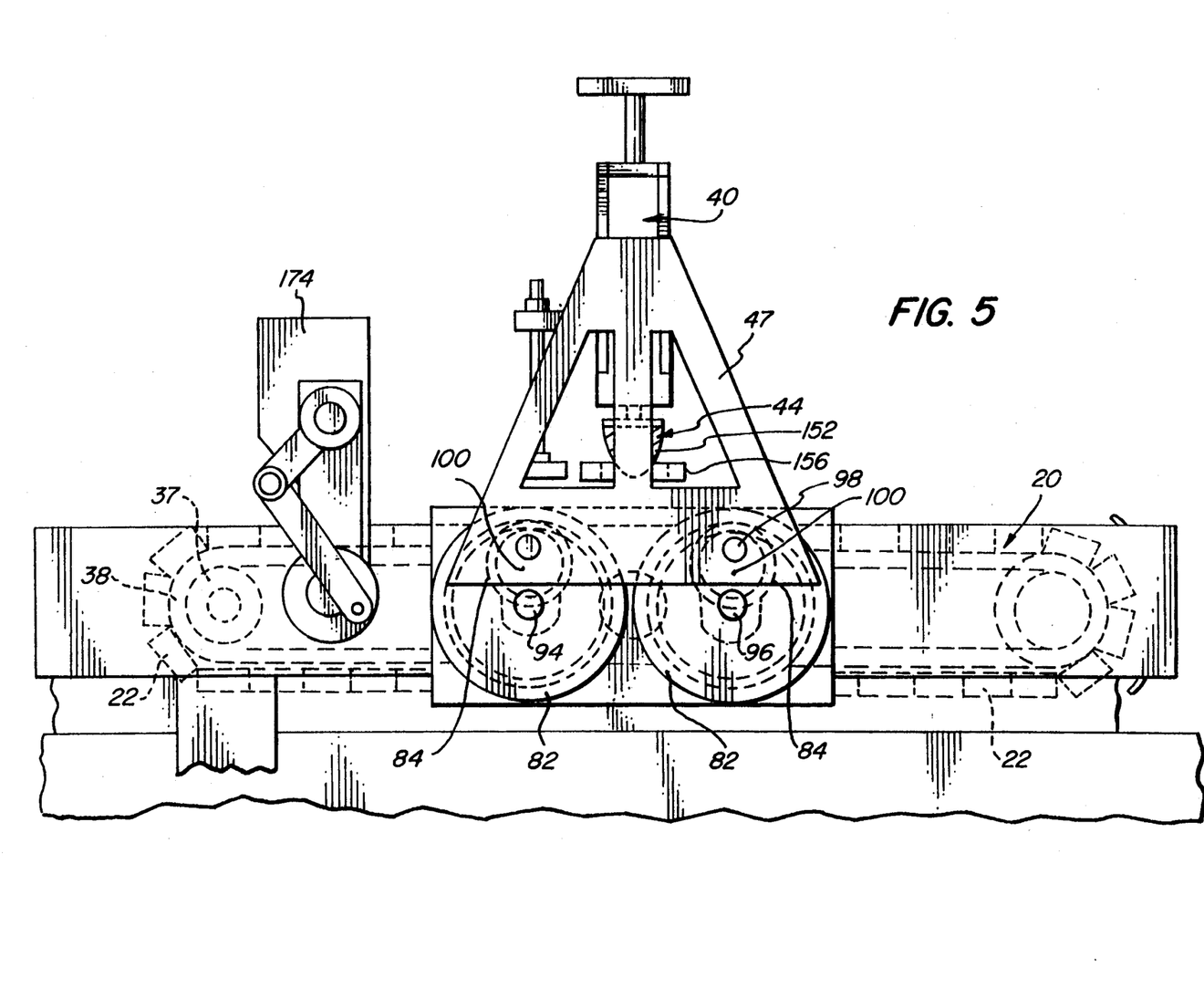
FIG. 5 is a side elevation view of the apparatus of FIG. 1, showing the operation of the pinion ring assembly in conjunction with the stamping head.

The stamping head 40, as shown in FIG. 4, is provided with a means for translating vertical motion of the stamping head 40 to rotational motion of the pattern stamping tools 44, such that the pattern stamping tools 44 are rotated to form a pattern 150 in the dough 39 when the stamping head 40 is lowered to the container. The die 152 of the pattern stamping tools 44 preferably has a generally spiral star shaped tip 154 portion for forming a pattern in the dough. Die 152 may comprise a helical screw.

One means for translating vertical motion of the stamping head 40 to rotational motion of the pattern stamping tools 44 includes a spring loaded striker plate 156 located at the lower end of the stamping head 40; a worm gear train 158 which is caused to rotate when the striker plate 156 is pushed down on cups 22; a horizontal shaft 160 coupled by worm gears 162 to the worm gear train 158 such that horizontal shaft 160 rotates when worm gear train 158 rotates; and a bevel gear assembly 164 between the horizontal shaft 160 and vertical shafts 166 of the pattern forming tools 44. The dies 152 are affixed to the lower ends of the vertical shafts 166. The shafts 166 and dies 152 are spaced apart to fit into cups 22 as cups 22 are conveyed beneath the stamping head 40. The striker plate 156 is located intermediate the pattern stamping tools 44 and the conveyor 20 and is affixed to the stamping head 40 by spring elements 168. Striker plate 156 is located to contact cups 22 during a terminal portion of the downward motion of the stamping head 40 and during an initial portion of the upward motion of the stamping head 40. Striker plate 156 has apertures 170 therein permitting dies 152 of the pattern forming tools 44 to pass through the striker plate 156 and into cups 22. Preferably, apertures 170 are generally star shaped to permit insertion and removal of the star shaped tips 154 in cups 22 while retaining dough 39 in cups 22 while the tips 154 are being withdrawn from dough 39.

Accordingly, as the striker plate 156 is located and pressed down on cups 22 by the elliptical path of stamping head 40, the worm gear train 158 is caused to rotate, as do the horizontal shaft 160 and bevel gear assembly 164 and vertical shafts 166 mechanically connected thereto, so that pattern forming tools 44, and in particular, tips 154 of dies 152 thereof, are caused to rotate when a pattern is to be stamped or imprinted on dough 39. In one embodiment, the dies 152 are rotated during a terminal portion of a downward stroke of head 40, and counterrotated during an initial portion of an upward stroke of head 40. In an alternative embodiment, a ratchet or clutch is provided such that the dies 152 are rotated only during the downward stroke, and there is no counterrotation during the upward stroke.

Figure 1:
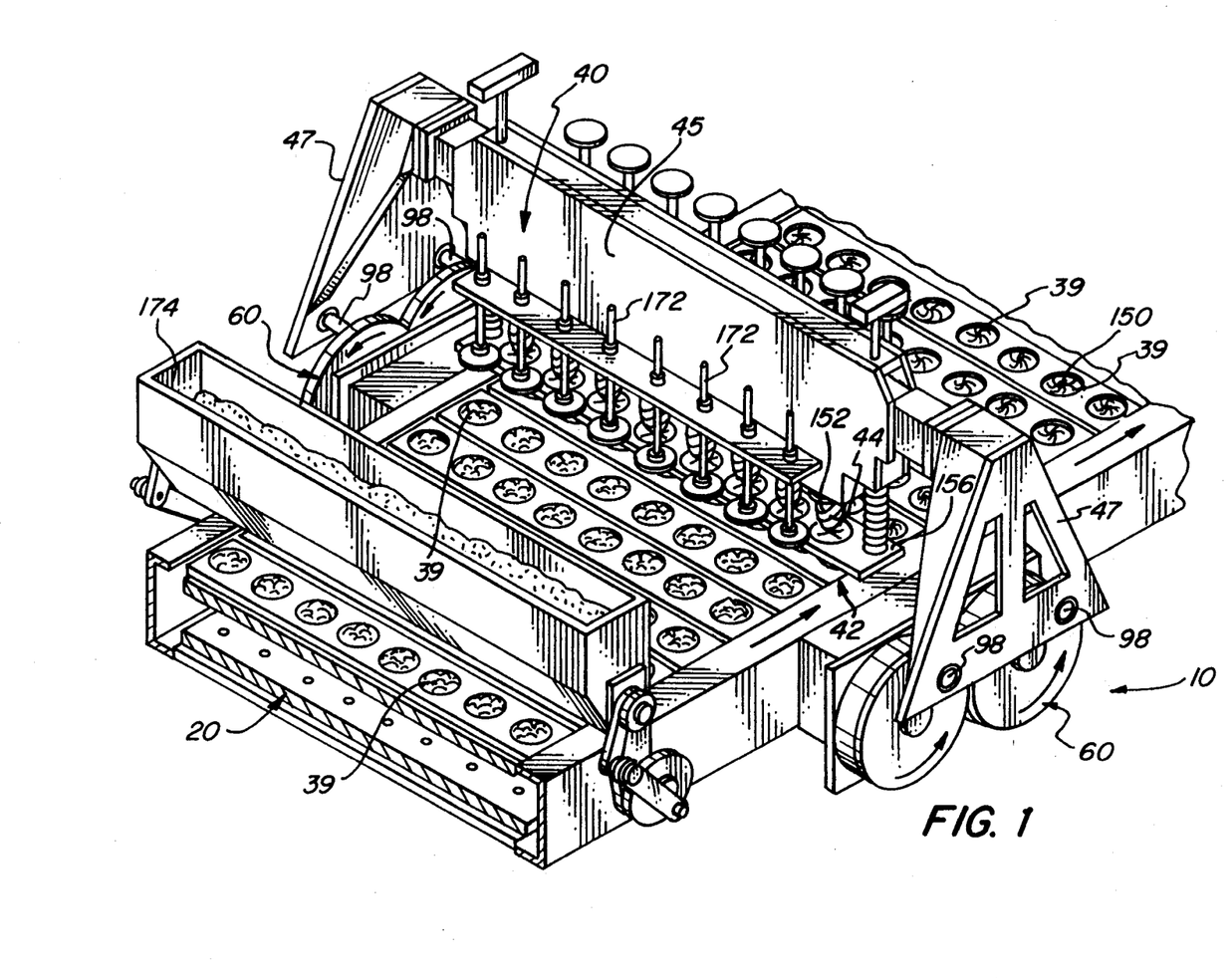
FIG. 1 is a perspective view of an apparatus for processing of a foodstuff, such as a bread dough, in accordance with an embodiment of the invention.

In FIGS. 6-11, the position of gear train 158 and bevel gear assembly 164 is rotated 90 degrees to the rear of head 40 for purposes of illustration. The preferred position of gear train 158 and bevel gear assemblies 164 is shown in FIGS. 1 and 4.

Stamping head 40 includes a case 45 for containing the motion translation machinery. Preferably stamping head 40 is supported at each end by triangular end plates 47 which are mounted to the supports 98.

A plurality of pre-flatteners 172 may be affixed to the stamping head 40 and located in front of the pattern forming tools 44 to pat the dough 39 and/or flatten its upper surface before a pattern is imprinted by the pattern stamping tools 44.

A flour dusting hopper and sifter 174 may be located to dust the dough 39 with flour prior to stamping by pattern forming tools 44.

A method of stamping a foodstuff in accordance with the invention generally comprises loading a plurality of foodstuffs such as dough 39 into containers such as cups 22; continuously conveying the containers through a stamping zone at a fixed speed; lifting and lowering a stamping head 40 in an elliptical path; reducing the orbital speed of the stamping head 40 to synchronize a lateral speed of the stamping head to the speed of a container during a downward stroke of the stamping head 40; stamping the foodstuff with pattern stamping tools 44 affixed to the stamping head 40 during a latter portion of the lowering step and in an initial portion of the lifting step; lifting the stamping head 40 upwardly to disengage the pattern stamping tools from the foodstuff; and increasing the orbital speed of the stamping head 40 during its upward stroke to cause the stamping head to be quickly repositioned to stamp a pattern in a subsequent foodstuff. Preferably, the pattern to be stamped in the foodstuff is stamped with a rotational motion of the pattern stamping tool, which rotational motion of the pattern stamping tool occurs during a terminal portion of the lowering step.

As is apparent from the above description, the present invention provides unique advantages in production speed and efficiency in the processing of foodstuffs, and in particular, the stamping or imprinting of a pattern in dough. It is estimated that the present invention can achieve a production rate of up to 70 strokes per minute of a stamping head without mutilation of the dough or otherwise creating an unsalable product. The invention therefore provides substantial advantages over known apparatus and methods for processing of foodstuffs.

I claim:

1. Apparatus for processing of a foodstuff, comprising:

means for continuously conveying a plurality of containers for containing a foodstuff;

means for stamping a pattern in a foodstuff;

a gearing mechanism for moving said stamping means in an elliptical path wherein said stamping means is lowered downwardly from a lifted position and is decelerated to synchronize a horizontal speed of the stamping means to a horizontal speed of said containers in said conveying means, whereupon said stamping means stamps said foodstuff, and thereafter said stamping means is lifted upwardly to disengage said stamping means from the foodstuff and accelerated and returned to said lifted position.

2. Apparatus in accordance with claim 1, wherein said gearing mechanism comprises a pinion ring assembly for moving said stamping means in said elliptical path, said pinion ring assembly comprising a plurality of fixed circular turret rings, each said turret ring having an inner perimeter having a plurality of radially inwardly extending teeth, and a plurality of circular turret pinions with radially outwardly extending teeth for mating with said turret ring teeth, and means for rotating said turret pinions and means for orbiting said turret pinions around said inner perimeter of said turret rings, said turret pinions each having an extending means for supporting said stamping means, said supporting means being located in a position offset from a center of each said turret pinion, whereby when said turret pinions are rotated and orbited around said inner perimeter of said turret rings, said supporting means and said stamping means travel in an elliptical path.

3. Apparatus in accordance with claim 2, wherein said elliptical path of said stamping head is oriented such that a major axis of said elliptical path is a vertical axis and a minor axis of said elliptical path is a horizontal axis, whereby a distance of the stamping head's vertical movement is greater than a distance of the stamping head's horizontal movement.

4. Apparatus in accordance with claim 3, wherein said offset position of said extending means is below said center of said turret pinion along a vertical line extending through said center of said turret pinion when said turret pinion is at a lowest point in its orbit around said turret ring.

5. Apparatus in accordance with claim 2, wherein said turret pinion makes one full 360 degree revolution for each orbit around the turret ring.

6. Apparatus in accordance with claim 1, wherein said gearing mechanism comprises an eccentric pinion assembly for accelerating and decelerating the speed of said stamping means, said eccentric pinion assembly having a first eccentric pinion mounted to a drive shaft, and a mating eccentric pinion affixed to a driven shaft, said stamping means being supported by said driven shaft.

7. Apparatus in accordance with claim 6, further comprising a second driven shaft, said driven shaft and said second driven shaft being mechanically coupled and synchronously rotating, said stamping means being supported by said driven shaft and said second driven shaft.

8. Apparatus for stamping a pattern in a foodstuff, comprising:

a conveyor for supporting containers for foodstuffs, and continuously advancing said foodstuffs through a stamping zone;

a stamping head for having a pattern stamping tool for stamping a foodstuff when said foodstuff is conveyed through said stamping zone;

a pinion ring assembly for moving said stamping head in an elliptical path, said pinion ring assembly having two circular turret rings located adjacent said conveyor, each said turret ring having an inner perimeter having a plurality of radially inwardly extending teeth and each said turret ring having a circular turret pinion with radially outwardly extending teeth for mating with said turret ring teeth, said turret pinions being rotably mounted to offset shaft segments of a driven shaft, and said turret pinions having an extending support, said stamping head being supported by said extending supports, said extending supports being rotably mounted to and located in a position offset from a center of each said turret pinion, whereby when said turret pinions are driven around said inner perimeter of said turret rings by rotation of said driven shaft, said supports and said stamping head travel in an elliptical path;

an eccentric pinion assembly for accelerating and decelerating the speed of said stamping head, said eccentric pinion assembly having a first eccentric pinion mounted to a drive shaft, and a mating eccentric pinion affixed to said driven shaft, whereby as said stamping head is lowered downwardly in its elliptical path from a lifted position it is decelerated to synchronize the lateral speed of the stamping head to the speed of said foodstuff in said conveyor, whereupon said pattern stamping tool stamps a foodstuff while said foodstuff is located in said stamping zone, and said stamping head is thereafter lifted upwardly to disengage said pattern stamping tool from the foodstuff and accelerated and returned to said lifted position.

9. Apparatus in accordance with claim 8, wherein said elliptical path of said stamping head is oriented such that a major axis of said elliptical path is a vertical axis and a minor axis of said elliptical path is a horizontal axis, whereby a distance of the stamping head's vertical movement is greater than a distance of the stamping head's horizontal movement.

10. Apparatus in accordance with claim 9, wherein said offset positions of said extending supports are below said centers of said turret pinions along vertical lines extending through said centers of said turret pinions when said turret pinions are at a lowest point in their orbits around said turret rings.

11. Apparatus in accordance with claim 10, wherein said turret pinions make one full 360 degree revolution for each orbit around their corresponding turret rings.

12. Apparatus in accordance with claim 11, wherein said turret pinions have an external diameter which is one-half an inner diameter of said turret rings.

13. Apparatus in accordance with claim 12, further comprising a second driven shaft, said driven shaft and said second driven shaft being mechanically coupled to synchronously rotate together, said second driven shaft having an offset shaft segment at each end thereof with turret pinions rotably mounted thereto, said turret pinions having gear teeth mating with gear teeth of circular turret rings, said second driven shaft turret pinions each having an extending support, said stamping head being supported by said second driven shaft extending supports, and said second driven shaft extending supports being located in a position offset from centers of said second shaft turret pinions, whereby said stamping head is supported at four points by said extending supports, and whereby rotation of said drive shaft causes rotation of said driven shaft and second driven shafts whereby said turret pinions are driven around said turret rings and said stamping head travels in an elliptical path.

14. Apparatus in accordance with claim 9, wherein said first eccentric pinion is oriented with its smaller lobe adjacent the larger lobe of the second eccentric pinion when said turret pinions are located in the lower portion of their orbit, and wherein said first eccentric pinion is oriented with its larger lobe adjacent the smaller lobe of the second eccentric pinion when said turret pinions are located in the upper portion of their orbit.

15. Apparatus for stamping a pattern in a bread dough, comprising:
a plurality of cups for receiving bread dough;
a conveyor for supporting rows of said cups and continuously advancing said rows of cups through a stamping zone;
a stamping head for having a plurality of pattern stamping tools for stamping the dough in each said cup when a row of said cups is conveyed through said stamping zone;
a pinion ring assembly for moving said stamping head in an elliptical path, said pinion ring assembly having a plurality of circular turret rings located on lateral sides of said conveyor, each said turret ring having an inner perimeter with a plurality of radially inwardly extending teeth and each said turret ring having a corresponding circular turret pinion with radially outwardly extending teeth for mating with said turret ring teeth, said turret pinions each having an extending support, said stamping head being rotably mounted on said extending supports, said extending supports being located in a position offset from a center of each said turret pinion, whereby when said turret pinions are driven around said turret rings, said stamping head is lifted and lowered in an elliptical path;
an eccentric pinion assembly for accelerating and decelerating the speed of said stamping head, said eccentric pinion assembly having a first eccentric pinion mounted to a main drive shaft, and a mating eccentric pinion affixed to a first driven shaft,
said first driven shaft having offset shaft segments at each end thereof, said turret pinions being rotably mounted to said offset shaft segments whereby said turret pinions mounted thereto may be driven around said inner perimeter of corresponding turret rings by rotation of said first driven shaft;
a second driven shaft mechanically coupled to said first driven shaft to rotate synchronously therewith, said second driven shaft having an offset shaft segment at each end thereof and turret pinions rotably mounted to said second driven shaft offset shaft segments whereby said turret pinions mounted to said second driven shaft may be driven around said inner perimeter of corresponding turret rings by rotation of said second driven shaft;
whereby as said stamping head is lowered downwardly from a lifted position it is decelerated to synchronize the lateral speed of the stamping head to the speed of said cups, whereupon said pattern stamping tools stamp a pattern in the dough in a row of said cups while said row of cups is located in said stamping zone, and said stamping head is thereafter lifted upwardly to disengage said pattern stamping tools from the dough and accelerated and returned to said lifted position.

16. Apparatus in accordance with claim 15, wherein said elliptical path of said stamping head is oriented such that a major axis of said elliptical path is a vertical axis and a minor axis of said elliptical path is a horizontal axis, whereby a distance of the stamping head's vertical movement is greater than a distance of the stamping head's horizontal movement.

17. Apparatus in accordance with claim 16, wherein said offset positions of said extending supports are below the centers of their respective turret pinions along a vertical line extending through said centers of said turret pinions when said turret pinions are at a lowest point in their orbits around said turret ring.

18. Apparatus in accordance with claim 17, wherein said turret pinions make one full 360 degree revolution for each orbit around their corresponding turret rings.

19. Apparatus in accordance with claim 18, wherein said turret pinions have an external diameter which is one-half an inner diameter of said turret rings.

20. Apparatus in accordance with claim 19, wherein said first eccentric pinion is oriented with a smaller lobe thereof adjacent a larger lobe of said second eccentric pinion when said turret pinions are located in a lower portion of their orbits, and wherein said first eccentric pinion is oriented with a larger lobe thereof adjacent a smaller lobe of said second eccentric pinion when said turret pinions are located in an upper portion of their orbits.

21. Apparatus in accordance with claim 20, wherein said stamping head comprises:
a case,
a horizontal shaft contained in said case;
a spring returnable means for mechanically translating vertical linear motion of said stamping head to horizontal rotational motion of said horizontal shaft, said translating means being mechanically actuated during a terminal portion of a downward movement and an initial portion of an upward movement of said stamping head;
a plurality of said pattern stamping tools, each having a vertical shaft coupled to said horizontal shaft by bevel gear means for translating horizontal rotational movement of said horizontal shaft to vertical rotational movement of said vertical shafts of said pattern stamping tools, each said vertical shaft having a pattern forming die at a lower end thereof, each said tool being spaced apart across a length of said stamping head such that said pattern stamping tools are receivable in said cups when said stamping head is lowered, whereby said pattern stamping tools are caused to rotate by said respective translating means during a terminal portion of the downward motion of said stamping head to form a pattern in said dough; and
a striker plate located intermediate said pattern stamping tools and said conveyor and affixed to said stamping head by spring elements, said striker plate being located to contact said cups during a terminal portion of the downward motion of said stamping head and an initial portion of the upward motion of the stamping head, and having apertures therein permitting said dies of said pattern forming tools to pass through said striker plate and into said cups.

22. Apparatus in accordance with claim 21, wherein said die of said pattern stamping tool has a generally spiral star shaped tip portion for forming a pattern in the dough, and wherein each said aperture in said striker plate is generally star shaped to permit insertion and removal of said die tip portions while retaining said bread dough in said cups during removal of said dies from said dough.

23. Apparatus in accordance with claim 21, further comprising a plurality of pre-flatteners affixed to said stamping head and located in front of said pattern forming tools.

24. Apparatus in accordance with claim 20, wherein said conveyor comprises a conveyor pinion affixed to said main drive shaft, said conveyor pinion driving one gear of a dual idler gear rotably mounted on said second driven shaft, a second gear of said dual idler gear driving a conveyor driven gear mounted to a conveyor driven shaft, said conveyor driven shaft having a conveyor drive sprocket for driving a chain loop, said cups being affixed to said chain loop.

* * * * *